US008724190B2

(12) United States Patent
Kitayama et al.

(10) Patent No.: US 8,724,190 B2
(45) Date of Patent: May 13, 2014

(54) IMAGE FORMING APPARATUS, IMAGE FORMING METHOD, AND COMPUTER-READABLE RECORDING MEDIUM

(75) Inventors: Masahiro Kitayama, Kanagawa (JP); Hiromitsu Shimizu, Kanagawa (JP); Yasuaki Miyazaki, Kanagawa (JP); Yuji Sone, Kanagawa (JP); Shota Miyajima, Kanagawa (JP); Kohichi Irie, Kanagawa (JP); Shigeto Miyauchi, Kanagawa (JP); Wei Jing, Ibaraki (JP)

(73) Assignee: Ricoh Company, Limited, Tokyo (JP)

( * ) Notice: Subject to any disclaimer, the term of this patent is extended or adjusted under 35 U.S.C. 154(b) by 74 days.

(21) Appl. No.: 13/466,563

(22) Filed: May 8, 2012

(65) Prior Publication Data

US 2012/0287486 A1    Nov. 15, 2012

(30) Foreign Application Priority Data

May 9, 2011   (JP) .................................. 2011-104219

(51) Int. Cl.
*H04N 1/04* (2006.01)
(52) U.S. Cl.
USPC ........... 358/498; 358/474; 358/486; 358/496; 399/10.03; 399/153; 271/258.01
(58) Field of Classification Search
CPC ... H04N 1/00062; H04N 1/12; H04N 1/0062; H04N 1/0057; B65H 7/12; B65H 2511/515; B65H 9/101; B41J 11/007; B41J 11/009; B41J 3/0018; B41J 13/103; G06K 7/00; G06K 15/16

USPC ................ 358/498, 496, 486, 474, 497, 501; 271/3, 8, 258.03, 8.1, 10.03, 10.14, 271/258.01, 153; 399/391, 367, 23, 45, 399/215, 361
See application file for complete search history.

(56) References Cited

U.S. PATENT DOCUMENTS

| 4,283,773 | A | * | 8/1981 | Daughton et al. ................. 700/3 |
| 4,839,740 | A | * | 6/1989 | Yoshida .......................... 358/498 |
| 5,450,175 | A | * | 9/1995 | Sato et al. ...................... 399/201 |
| 5,455,667 | A | * | 10/1995 | Hiroi et al. .................... 399/373 |
| 5,561,535 | A |   | 10/1996 | Katoh et al. |
| 5,694,201 | A | * | 12/1997 | Hayashi et al. ............... 396/109 |

(Continued)

FOREIGN PATENT DOCUMENTS

| JP | 2000-62292 | 2/2000 |
| JP | 2003-39777 | 2/2003 |
| JP | 2010-211119 | 9/2010 |

*Primary Examiner* — Negussie Worku
(74) *Attorney, Agent, or Firm* — Oblon, Spivak, McClelland, Maier & Neustadt, L.L.P.

(57) ABSTRACT

An image forming apparatus includes an image forming unit configured to start image formation in accordance with a second job while performing the image formation in accordance with a first job, each of the first job and the second job including information indicating one of paper feeding units; a detecting unit configured to detect whether a recording medium is stored in a paper feeding unit indicated by the first job; and an image formation control unit configured to cause the image forming unit to continue the image formation in accordance with the second job when the detecting unit detects that a recording medium is stored in the paper feeding unit, and cause the image forming unit to suspend the image formation in accordance with the second job when the detecting unit detects that no recording medium is stored in the paper feeding unit.

8 Claims, 10 Drawing Sheets

(56) References Cited

U.S. PATENT DOCUMENTS

| | | | | |
|---|---|---|---|---|
| 6,708,234 | B2 | 3/2004 | Moteki et al. | |
| 6,980,702 | B2 | 12/2005 | Michiie et al. | |
| 6,985,245 | B1 * | 1/2006 | Takahashi | 358/1.15 |
| 7,034,838 | B2 | 4/2006 | Obata et al. | |
| 7,140,534 | B2 * | 11/2006 | Miyazawa et al. | 235/375 |
| 7,142,730 | B2 | 11/2006 | Michiie et al. | |
| 7,185,151 | B2 | 2/2007 | Michiie et al. | |
| 7,259,876 | B2 | 8/2007 | Obata et al. | |
| 7,831,193 | B2 * | 11/2010 | Minakuchi | 399/391 |
| 7,924,475 | B2 * | 4/2011 | Suzuki | 358/474 |
| 8,146,911 | B2 * | 4/2012 | Kozaki | 271/4.01 |
| 8,248,650 | B2 * | 8/2012 | Kashiwagi | 358/1.16 |
| 8,264,752 | B2 * | 9/2012 | Katsuyama | 358/498 |
| 8,390,898 | B2 * | 3/2013 | Mizutani | 358/440 |
| 8,480,071 | B2 * | 7/2013 | Asada et al. | 271/3.15 |
| 2005/0231764 | A1 | 10/2005 | Michiie et al. | |
| 2005/0275892 | A1 | 12/2005 | Obata et al. | |
| 2006/0050315 | A1 | 3/2006 | Obata et al. | |
| 2006/0059281 | A1 | 3/2006 | Michiie et al. | |

* cited by examiner

FIG.4

| JOB ID | PROCESS ID | USER ID | FUNCTION NAME | DISCHARGING UNIT INFORMATION | PAPER FEEDING UNIT INFORMATION | IMAGE INFORMATION |
|---|---|---|---|---|---|---|
| 01 | 001 | 1101 | PRINT | DISCHARGE TRAY a | PAPER FEED TRAY a | IMAGE 01001 |
| 01 | 002 | 1101 | PRINT | DISCHARGE TRAY a | PAPER FEED TRAY b | IMAGE 01002 |
| 01 | 003 | 1101 | PRINT | DISCHARGE TRAY a | PAPER FEED TRAY b | IMAGE 01003 |
| 02 | 001 | 1101 | COPY | DISCHARGE TRAY b | PAPER FEED TRAY c | IMAGE 02001 |
| 02 | 002 | 1101 | COPY | DISCHARGE TRAY b | PAPER FEED TRAY c | IMAGE 02002 |
| 03 | 001 | 1102 | COPY | DISCHARGE TRAY a | PAPER FEED TRAY a | IMAGE 03001 |
| 03 | 002 | 1102 | COPY | DISCHARGE TRAY a | PAPER FEED TRAY b | IMAGE 03002 |
| ⋮ | ⋮ | ⋮ | ⋮ | ⋮ | ⋮ | ⋮ |

IMAGE FORMING APPARATUS, IMAGE FORMING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2011-104219 filed in Japan on May 9, 2011.

BACKGROUND OF THE INVENTION

1. Field of the Invention

The present invention relates to an image forming apparatus, an image forming method, and a computer-readable recording medium.

2. Description of the Related Art

Known printing apparatuses perform printing based on image information about an image to be printed and information that indicates, for example, paper used for the printing. In this process, it is first detected whether paper is loaded in a paper feeding unit. An image forming process is started based on the image information only after it is detected that paper is loaded in the paper feeding unit.

If the image forming process involves use of a plurality of developing units, however, the image forming process requires a longer time than time required by a paper feeding process, so that the paper feeding process is started after the image forming process is started (see Japanese Patent Application Laid-open No. 2010-211119, for example). In the technique disclosed in Japanese Patent Application Laid-open No. 2010-211119, unlike the known printing apparatuses, the image forming process is started without any confirmation that paper is loaded.

Another known technique allows a job, among others in a standby state, not affected by an error to be processed without suspension when a paper-out condition or other error occurs in a printing apparatus (see Japanese Patent Application Laid-open No. 2000-062292, for example). In the technique disclosed in Japanese Patent Application Laid-open No. 2000-062292, when one paper feed tray is not replenished with additional paper, a job that is set to use another paper feed tray loaded with paper is preferentially subjected to printing.

In the image forming apparatus that uses a technique as described above, however, an image forming process for a first job is started and then an image forming process for a second job is started before a paper feeding process for the first job is started. If the paper feeding unit, for example, no paper is loaded in a paper feed tray at a point in time at which the paper feeding process is started, therefore, the image forming process in accordance with the second job that follows the first job is already started before that particular point in time. Assume that the recording medium associated with the second job is available at this time, the image forming process for the first job is suspended, while the image forming process for the second job is continued. This results in the following: specifically, whereas an incomplete set of recording media with the image formed thereon in accordance with the first job is discharged to a discharging unit, for example, a discharge tray, a complete set of recording media with the image formed thereon in accordance with the second job is discharged. Therefore, a user has an incomplete set of recording media with the image formed thereon in accordance with the first job mixed with a complete set of recording media with the image formed thereon in accordance with the second job on the discharging unit, for example, the discharge tray, so that the user is confused.

SUMMARY OF THE INVENTION

It is an object of the present invention to at least partially solve the problems in the conventional technology.

According to an embodiment, there is provided an image forming apparatus that includes an image forming unit configured to perform image formation in accordance with jobs including a first job and a second job, the image forming unit starting image formation in accordance with the second job while performing the image formation in accordance with the first job, each of the first job and the second job including paper feeding unit information indicating one of paper feeding units; a detecting unit configured to detect whether a recording medium is stored in a paper feeding unit indicated by the paper feeding unit information of the first job; and an image formation control unit configured to cause the image forming unit to continue the image formation in accordance with the second job when the detecting unit detects that a recording medium is stored in the paper feeding unit, and cause the image forming unit to suspend the image formation in accordance with the second job when the detecting unit detects that no recording medium is stored in the paper feeding unit.

According to another embodiment, there is provided an image forming method that includes performing image formation in accordance with a first job that includes paper feeding unit information indicating one of paper feeding units; starting image formation in accordance with a second job that includes paper feeding unit information indicating one of the paper feeding units while performing the image formation in accordance with the first job; detecting whether a recording medium is stored in a paper feeding unit indicated by the paper feeding unit information of the first job; and continuing the image formation in accordance with the second job when it is detected that a recording medium is stored in the paper feeding unit, and suspending the image formation in accordance with the second job when it is detected that no recording medium is stored in the paper feeding unit.

According to still another embodiment, there is provided a non-transitory computer-readable recording medium with an executable program stored thereon. The program instructs a processor of an image forming apparatus to perform performing image formation in accordance with a first job that includes paper feeding unit information indicating one of paper feeding units; starting image formation in accordance with a second job that includes paper feeding unit information indicating one of the paper feeding units while performing the image formation in accordance with the first job; detecting whether a recording medium is stored in a paper feeding unit indicated by the paper feeding unit information of the first job; and continuing the image formation in accordance with the second job when it is detected that a recording medium is stored in the paper feeding unit, and suspending the image formation in accordance with the second job when it is detected that no recording medium is stored in the paper feeding unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a conceptual diagram illustrating a job managing table;

FIG. 11A is a flowchart illustrating another example of processing performed by the determining unit.

DETAILED DESCRIPTION OF THE PREFERRED EMBODIMENTS

Exemplary embodiments of an image forming apparatus, an image forming method, and a computer-readable recording medium according to the present invention will be described in detail late with reference to the accompanying drawings.

First Embodiment

A first embodiment of the present invention will be described below with reference to FIGS. 1 to 8.

Figure 1:
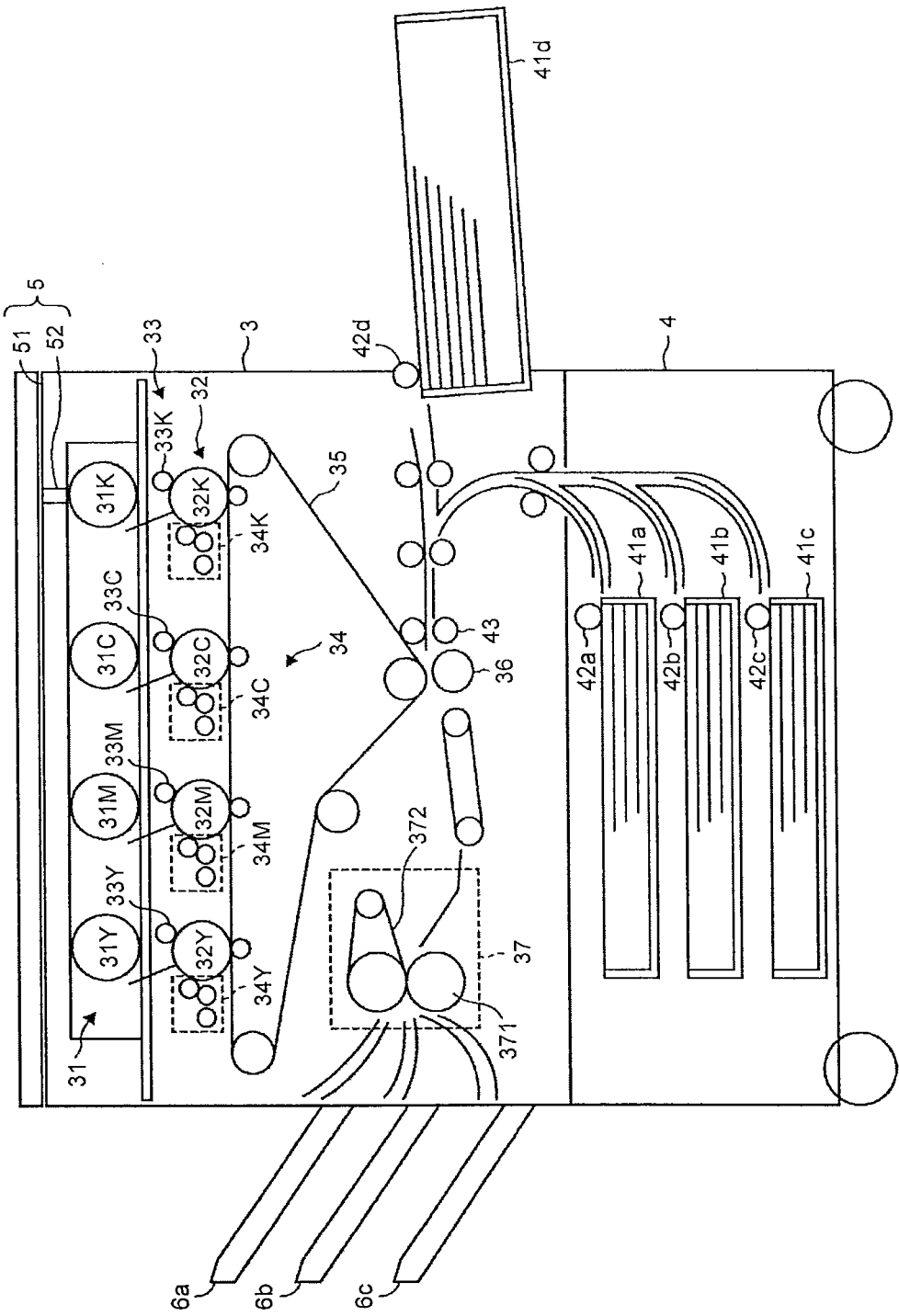
FIG. 1 is a hardware configuration diagram of an image forming apparatus.

A hardware configuration of the first embodiment will be described. FIG. 1 is a hardware configuration diagram of an MFP as an exemplary image forming apparatus. The image forming apparatus according to the first embodiment includes a control unit (not illustrated), a printer 3, a paper feeding unit 4, and a scanning unit 5.

Figure 2:
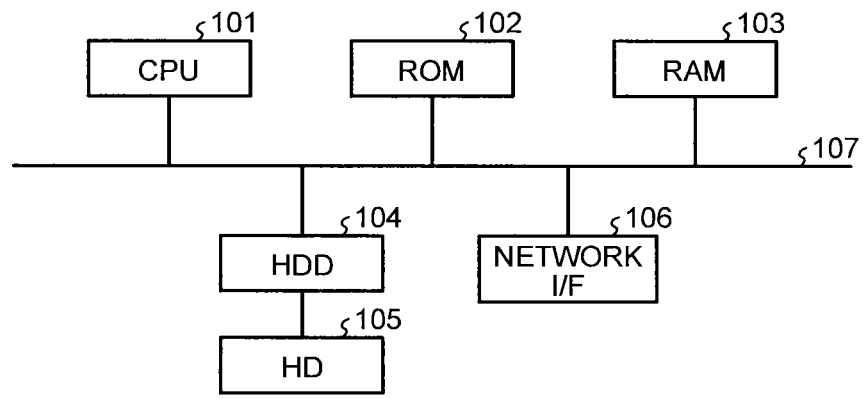
FIG. 2 is a hardware configuration diagram of a control unit.

FIG. 2 is a hardware configuration diagram of the control unit included in the image forming apparatus according to the first embodiment. The hardware configuration of the control unit will be described below with reference to FIG. 2. The control unit includes a central processing unit (CPU) 101, a read only memory (ROM) 102, a random access memory (RAM) 103, a hard disk drive (HDD) 104, a hard disk (HD) 105, a network interface (I/F) 106, and a bus line 107.

The CPU 101 controls general operations of the image forming apparatus. The ROM 102 stores therein information such as a system starting program. The RAM 103 is used as a work area for the CPU 101 to execute an image forming program. The HD 105 is a storage unit that stores therein data and may be replaced by an external storage device such as compact disc read only memory (CD-ROM), a compact disc recordable (CD-R), and a digital versatile disc (DVD). The network I/F 106 transmits data using a communication network. The bus line 107 is to connect the different elements mentioned above.

The image forming program stored in the ROM 102 may be provided by being recorded as a file of an installable or executable format on a computer-readable recording medium, such as a CD-ROM, a CD-R, and a DVD.

Referring back to FIG. 1, the hardware configuration of the printer 3 will be described.

The printer 3 includes a cartridge 31, a photosensitive drum 32, a charging unit 33, a developing unit 34, an intermediate transfer belt 35, a secondary transfer roller 36, and a fixing unit 37.

The cartridge 31 includes four cartridges 31Y, 31M, 31C, and 31K, which contain yellow (Y) toner, magenta (M) toner, cyan (C) toner, or black (K) toner, respectively. Hereinafter, any one of the cartridges 31Y, 31M, 31C, and 31K is sometimes referred to as the cartridge 31.

The photosensitive drum 32 includes four photosensitive drums 32Y, 32M, 32C, and 32K, which correspond to the respective types of toner. Hereinafter, any one of the photosensitive drums 32Y, 32M, 32C, and 32K is sometimes referred to as the photosensitive drum 32. The photosensitive drum 32 has a surface that is uniformly charged by the corresponding charging unit 33 described later and on which an electrostatic latent image is thereby formed based on image information received from the control unit. In addition, the surface of the photosensitive drum 32 on which the electrostatic latent image is formed is affixed with toner by the corresponding developing unit 34 described later to thereby form an image.

The charging unit 33 includes four charging units 33Y, 33M, 33C, and 33K, which correspond to the respective types of toner. Hereinafter, any one of charging units 33Y, 33M, 33C, and 33K is sometimes referred to as the charging unit 33. The charging unit 33 contacts the corresponding photosensitive drum 32 and applies voltage thereto, thereby charging the surface of the corresponding photosensitive drum 32.

The developing unit 34 includes four developing units 34Y, 34M, 34C, and 34K, which correspond to the respective type of toner. Hereinafter, any one of the developing units 34Y, 34M, 34C, and 34K is sometimes referred to as the developing unit 34. The developing unit 34 affixes toner contained in the corresponding cartridge 31 to the corresponding photosensitive drum 32 to thereby form an image on the surface of the corresponding photosensitive drum 32.

The intermediate transfer belt 35 is fed off while being abutted on the photosensitive drum 32, so that an image is formed on the surface of the intermediate transfer belt 35. With the image formed on its surface, the intermediate transfer belt 35 secondarily transfers the image onto a recording medium.

The secondary transfer roller 36 nips the recording medium transported from the paper feeding unit 4 with the intermediate transfer belt 35, thereby transferring the image formed on the intermediate transfer belt 35 secondarily onto the recording medium and feeds the recording medium on which the image is transferred onto the fixing unit 37.

The fixing unit 37 fixes the image into the recording medium fed from the secondary transfer roller 36. The fixing unit 37 includes a pressing roller 371 and a fixing belt 372. The pressing roller 371 presses the recording medium against the fixing belt 372 and applies heat to the recording medium to thereby fix the image thereinto. The fixing belt 372 presses the recording medium against the pressing roller 371 to thereby fix the image into the recording medium.

The paper feeding unit 4 supplies a recording medium such as paper to the printer 3. The paper feeding unit 4 includes a plurality of paper feed trays 41a, 41b, 41c, and 41d, a plurality of paper feeding rollers 42a, 42b, 42c, and 42d, and a registration roller 43. Hereinafter, any one of the paper feed trays 41a, 41b, 41c, and 41d is referred to as a paper feed tray 41; any one of the paper feeding rollers 42a, 42b, 42c, and 42d is referred to as a paper feeding roller 42.

The paper feed tray 41 stores therein a recording medium such as paper. The paper feeding roller 42 takes up the recording medium stored in the paper feed tray 41 and feeds the same onto the registration roller 43. The registration roller 43 feeds the recording medium fed by the paper feeding roller 42 into a nip between the intermediate transfer belt 35 and the secondary transfer roller 36.

The scanning unit 5 reads image information described on, for example, paper. The scanning unit 5 includes an exposure glass 51 and a reading sensor 52. The exposure glass 51 serves as a surface on which the paper on which image is described is placed. The reading sensor 52 reads the image information described on the paper that is placed on the exposure glass 51.

Discharging units 6a, 6b, and 6c stack therein the recording medium on which the image is formed by the printer 3 and discharged. Hereinafter, any one of the discharging units 6a, 6b, and 6c is referred to as a discharging unit 6.

Figure 3:
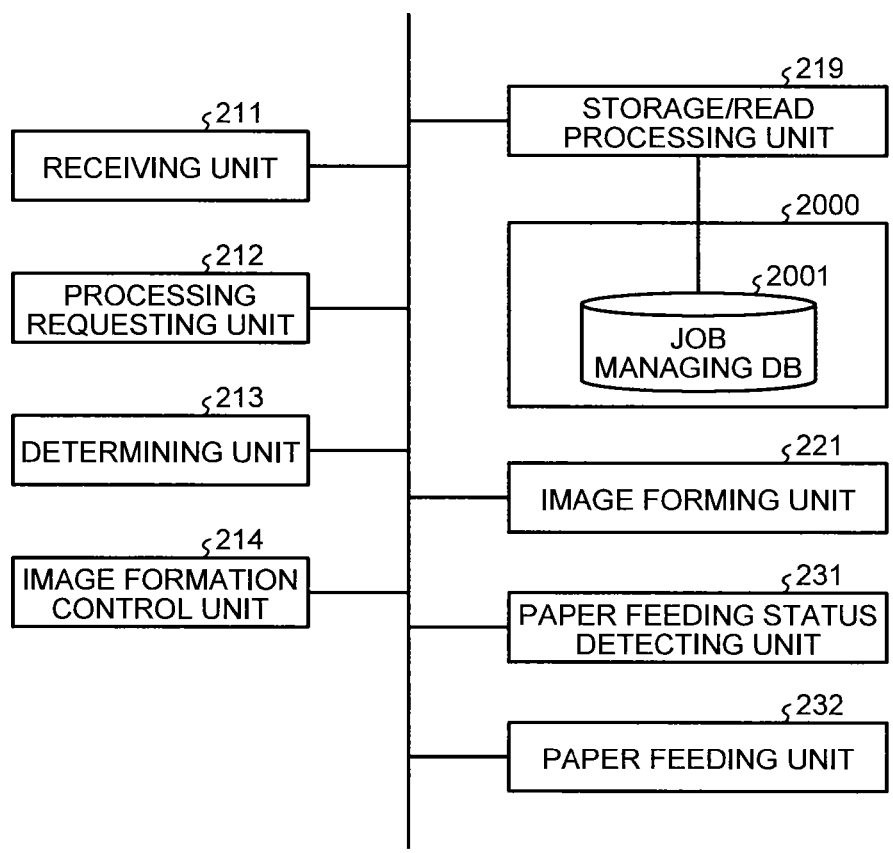
FIG. 3 is a functional configuration diagram of the image forming apparatus.

FIG. 3 illustrates a functional configuration diagram of the image forming apparatus according to the first embodiment. Referring to FIG. 3, the image forming apparatus according to the first embodiment includes a receiving unit 211, a processing requesting unit 212, a determining unit 213, an image formation control unit 214, a storage/read processing unit 219, an image forming unit 221, a paper feeding status detecting unit 231, and a paper feeding unit 232. Each of these units corresponds to a function or means to be achieved when any one of the components illustrated in FIG. 2 is operated by instructions from the CPU 101 according to a program stored in the ROM 102. In addition, the image forming apparatus includes a storage 2000 that is formed by the RAM 103 and the HD 105 illustrated in FIG. 2.

The receiving unit 211 is achieved by the network I/F 106 illustrated in FIG. 2 and receives a job that contains image information transmitted from, for example, an information processing apparatus, paper feeding unit information, and attribute information. As used herein, the term "job" refers to a set of information including image information and attribute information to be transmitted to the image forming apparatus when the user instructs image formation. In addition, the job is formed of one or more processes, each process corresponding to the image information and the attribute information. The process is a unit of forming an image through one cycle of a series of steps from image formation to discharging performed once by the image forming apparatus and corresponds to one printed page of paper.

The image information indicates the image to be formed on the recording medium. The paper feeding unit information indicates the paper feeding unit, for example, a paper feed tray that stores therein paper as the recording medium to be used for image formation. The attribute information indicates a nature of the job, including at least a user identification (ID) that serves as user identification information for identifying the user who transmits the job, a function name that serves as function identification information for identifying a function (for example, printing, facsimiling, and copying) of the image forming apparatus, and discharging unit information that indicates a discharging unit storing therein the recording medium on which an image is formed.

The processing requesting unit 212 is an exemplary image formation requesting unit and an exemplary paper feeding requesting unit. Operated by instructions from the CPU 101 according to a program stored in the ROM 102, the processing requesting unit 212 requests the image forming unit 221 and the paper feeding status detecting unit 231 to perform an image formation process and a paper feeding process, respectively. The determining unit 213 is an exemplary determining unit. Operated by instructions from the CPU 101 according to the program stored in the ROM 102, the determining unit 213 determines operation of the image forming unit 221 based on the attribute information and a paper feeding status detected by the paper feeding status detecting unit 231 based on the paper feeding unit information.

The image formation control unit 214 is an exemplary image formation control unit. Operated by instructions from the CPU 101 according to the program stored in the ROM 102, the image formation control unit 214 controls operation of the image forming unit 221 based on a result of a determination made by the determining unit 213.

The storage/read processing unit 219 is operated by instructions from the CPU 101 according to the program stored in the ROM 102, storing various types of data in, reading various types of data from, the storage 2000. The storage 2000 is achieved by the RAM 103 and the HD 105 illustrated in FIG. 2 and stores therein various types of data. A job managing database (DB) 2001 formed of a job managing table is built in the storage 2000.

The image forming unit 221 is an exemplary image forming unit. Achieved by, for example, the cartridge 31, the photosensitive drum 32, the charging unit 33, the developing unit 34, the intermediate transfer belt 35, the secondary transfer roller 36, and the fixing unit 37, the image forming unit 221 forms an image based on the image information.

The paper feeding status detecting unit 231 is an exemplary detector. Receiving a paper feeding request from the processing requesting unit 212, the paper feeding status detecting unit 231 determines whether the recording medium is stored in the paper feed tray indicated by the paper feeding unit information included in the job. The paper feeding unit 232 is achieved by the paper feed tray 41, the paper feeding roller 42, and the registration roller 43 illustrated in FIG. 1. The paper feeding unit 232 stores therein the recording medium such as paper and, if the paper feeding status detecting unit 231 detects that the recording medium is stored, supplies the image forming unit 221 with the recording medium.

The job managing DB 2001 formed of a job managing table as illustrated in FIG. 4 is built in the storage 2000.

The job managing table stores a process ID for uniquely identifying a process constituting a job in association with a job ID for uniquely identifying a job. The job managing table also stores the attribute information, the paper feeding unit information, and the image information in association with the process ID. The attribute information includes a user ID as user identification information for uniquely identifying a user who has requested printing using the job, a function name as function identification information for identifying a function which the image forming apparatus has, and paper discharging unit information that indicates a specific discharge tray of any one of the discharging units 6a, 6b, and 6c. For example, the job managing table illustrated in FIG. 4 illustrates that process IDs "001", "002", and "003" are stored in association with a job ID "01", and the job ID "01", a user ID "1101", a function name "print", discharging unit information "discharge tray a", and paper feeding unit information "paper feed tray a" are stored in association with the process ID "001".

Timing at which the image forming unit 221, the paper feeding status detecting unit 231, and the paper feeding unit 232 perform processing will be described below with reference to a timing chart illustrated in FIG. 5. It is here noted that a High signal on the time axis illustrated for image formation Y illustrated in FIG. 5 indicates that processing for forming a color-Y image is being performed and a Low signal on the time axis illustrated for the image formation Y indicates that the processing for forming the color-Y image is not being performed. Similarly, a High signal on the time axis illustrated for each of image formation M, image formation C, and image formation K illustrated in FIG. 5 indicates that processing for forming a corresponding color image of a color-M image, a color-C image, and a color-K image is being performed and a Low signal on the time axis illustrated for each of the image formation M, the image formation C, and the image formation K illustrated in FIG. 5 indicates that the processing for forming a corresponding color image of the color-M image, the color-C image, and the color-K image is not being performed. A High signal on the time axis illustrated for a paper feeding status detection and a paper feeding indicates that paper feeding detection processing or paper feeding processing is being performed and a Low signal on the time axis illustrated for the paper feeding status detection and the paper feeding indicates that neither processing is being performed.

Figure 5:
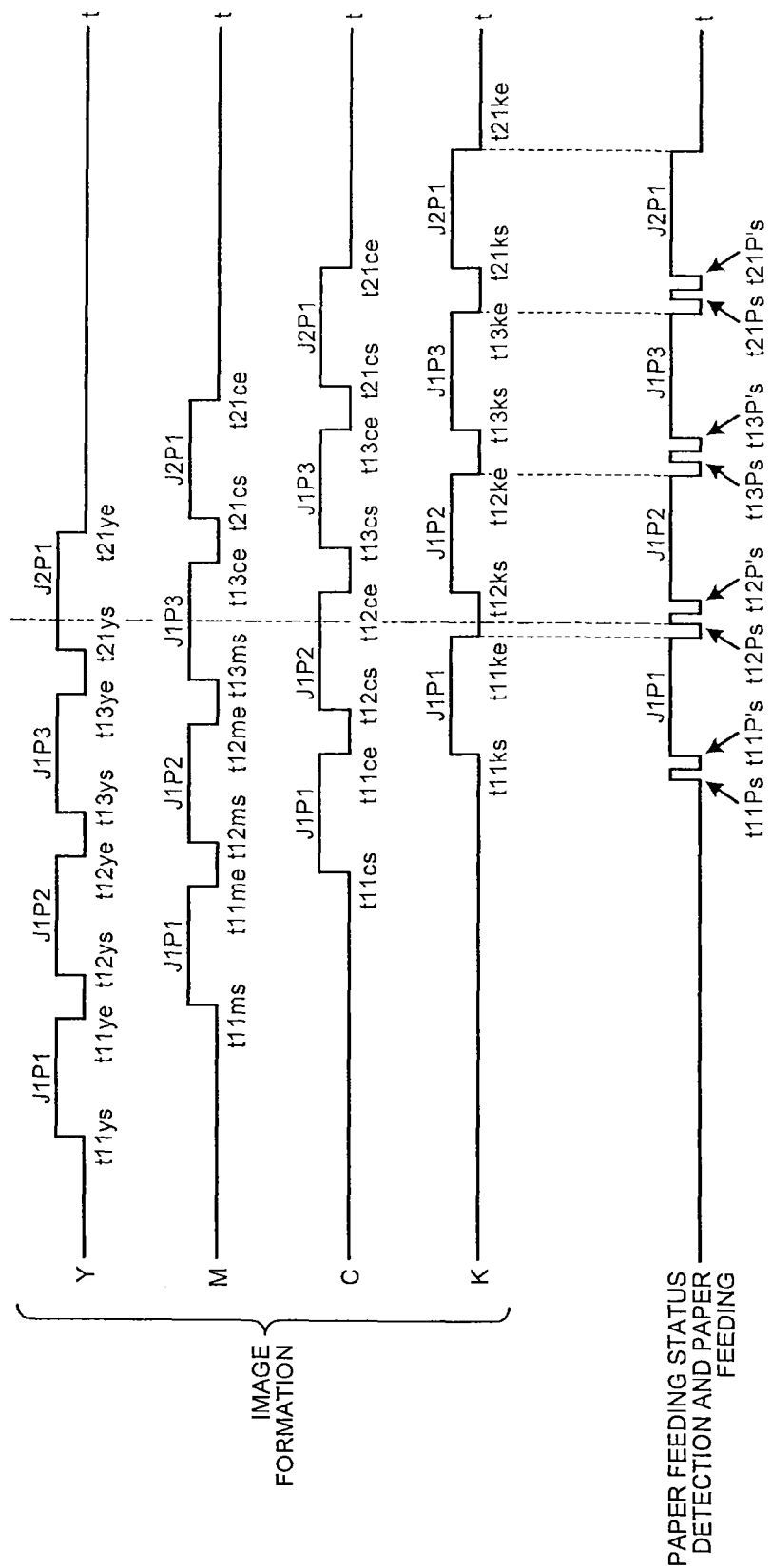
FIG. 5 is a timing chart illustrating timing of processing performed at an image forming unit, a paper feeding status detector, and a paper feeding unit.

Referring also to FIG. 5, J1P1 represents processing to be performed based on any one of the attribute information, the paper feeding unit information, and the image information associated with a job ID "01" and a process ID "001". Similarly, J1P2, J1P3, and J2P1 represent processing to be performed based on any one of the attribute information, the paper feeding unit information, and the image information associated with the job ID "01" and a process ID "002", the job ID "01" and a process ID "003", and a job ID "02" and the process ID "001", respectively. Details of processing performed by the image forming unit 221, the paper feeding status detecting unit 231, and the paper feeding unit 232 will be described later.

As described above, the image forming unit 221 of a color image forming apparatus includes four developing sections each including the cartridge 31, the photosensitive drum 32, the charging unit 33, the developing unit 34, and more. Time it takes such an image forming unit to process images is accordingly longer than that it takes the known monochrome image forming apparatus having only one developing section. A paper feeding process is, for this reason, started after the image forming process, which will be described below.

The image forming unit 221 starts an image forming process using the color-Y developing section at time t11ys based on the image information associated with the job ID "01" and the process ID "001" and completes the image forming process at time t11ye. At time t11ms after the time t11ys, the image forming unit 221 starts an image forming process using the color-M developing section and completes the image forming process at time t11me. Similarly, the image forming unit 221 performs image forming processes using the color-C and color-K developing sections. Meanwhile, to ensure that paper is fed to a secondary transfer position in time for timing at which image formation using all four colors of the developing sections is completed, the paper feeding status detecting unit 231 detects a paper feeding status at time t11Ps and, if paper is detected to be available, the paper feeding unit 232 starts a paper feeding process at time t11P's.

Next, for the job ID "01" and the process ID "002", the image forming unit 221 starts an image forming process at time t12ys that is after the time t11ye and completes the image forming process at time t12ye. The same holds true with other colors. In addition, to ensure that paper is fed to the secondary transfer position in time for timing at which image formation using all four colors of the developing sections is completed, the paper feeding status detecting unit 231 detects a paper feeding status at time t12Ps and, if paper is detected to be available, the paper feeding unit 232 starts a paper feeding process at time t12P's. It is to be noted that, if paper used for printing the job ID "01" and the process ID "001", for which the paper feeding process has been started, is in standby at the registration roller 43, neither the paper feeding status detecting unit 231 nor the paper feeding unit 232 performs respective processes for the job ID "01" and the process ID "002"; alternatively, after the paper used for printing the job ID "01" and the process ID "001" is fed to the secondary transfer position, the paper feeding status detecting unit 231 and the paper feeding unit 232 perform the respective processes for the job ID "01" and the process ID "002".

If the image forming process and the paper feeding process are performed at such timing, when the paper feeding status is detected at the time t12Ps in order to start feeding paper for the job ID "01" and the process ID "002", image forming processes for the job ID "01" and the process ID "003", and a job ID "02" and the process ID "001" that follow are already started.

In the related-art technique, when it is detected that no paper is loaded in a paper feed tray associated with the job ID "01" and the process ID "002" at the time t12Ps, as long as paper is loaded in a paper feed tray indicated by the paper feeding unit information associated with the job ID "02" and the process ID "001", these image forming processes and paper feeding processes are continued to complete the printing.

The foregoing processes result in a printed page of the job ID "01" and the process ID "001" and a printed page of the job ID "02" and the process ID "001" being discharged in sequence into the discharge tray. Specifically, printed pages of the job ID "01" and the process ID "002" and the job ID "01" and the process ID "003" are not discharged and, instead, printed pages produced by subsequent jobs are discharged on the discharge tray. The user then finds printed pages requested by him or her with some intermediate pages missing on the discharge tray and is confused.

Figure 6:
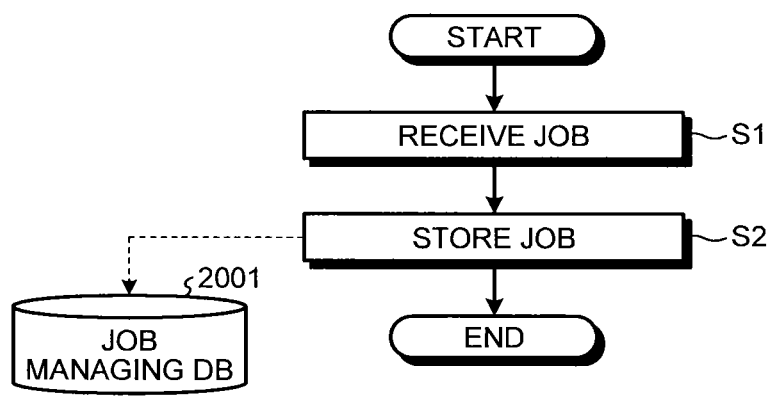
FIG. 6 is a flowchart illustrating processing performed for managing jobs.
Figure 7:
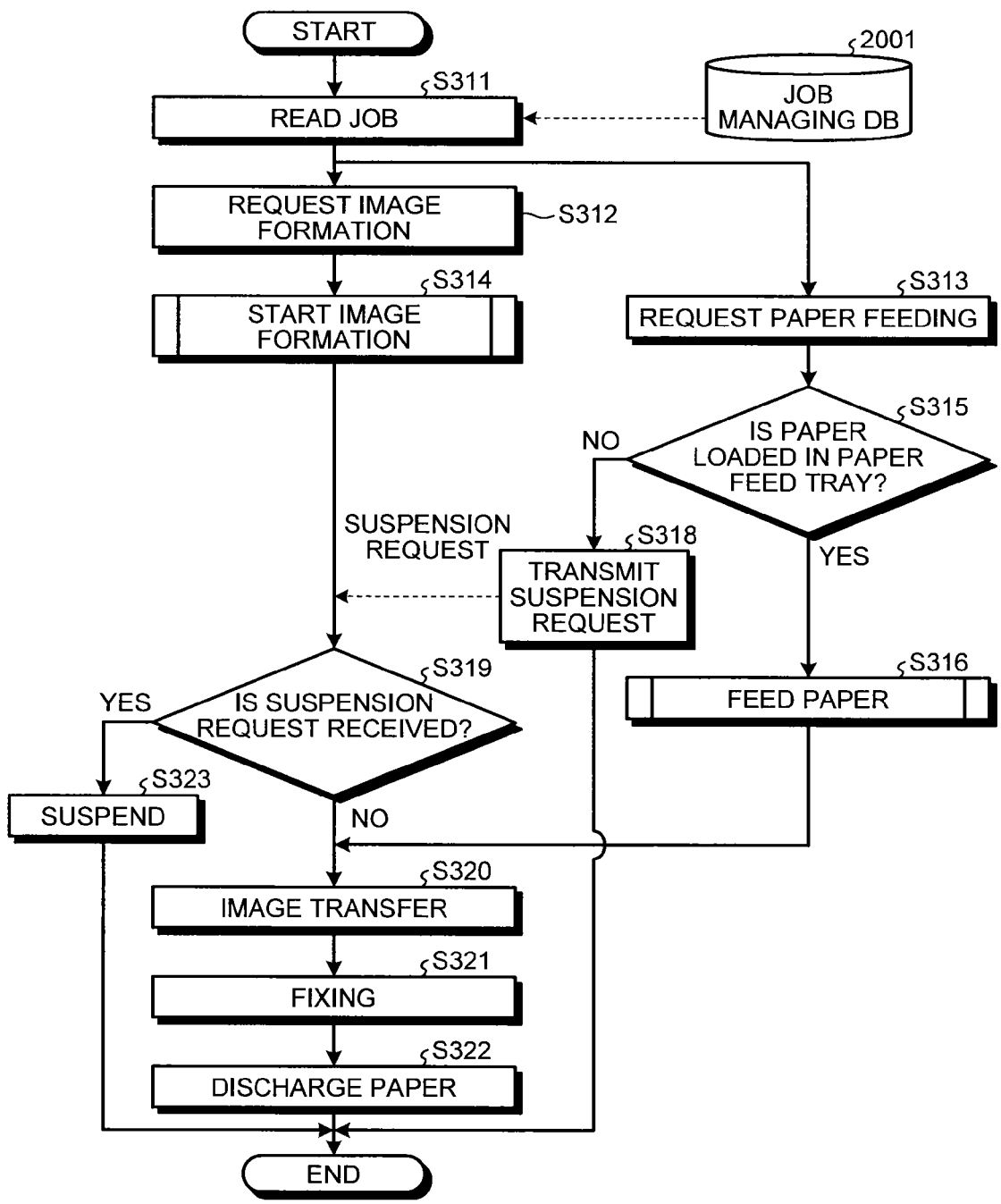
FIG. 7 is a flowchart illustrating processing performed by the image forming apparatus according to a first embodiment of the present invention.
Figure 8:
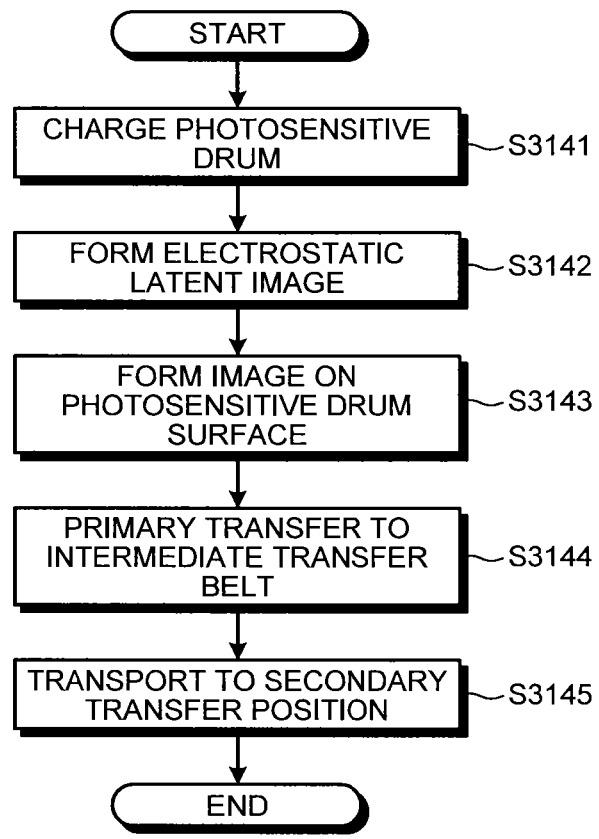
FIG. 8 is a flowchart illustrating details of processing performed by the image forming unit.
Figure 9:
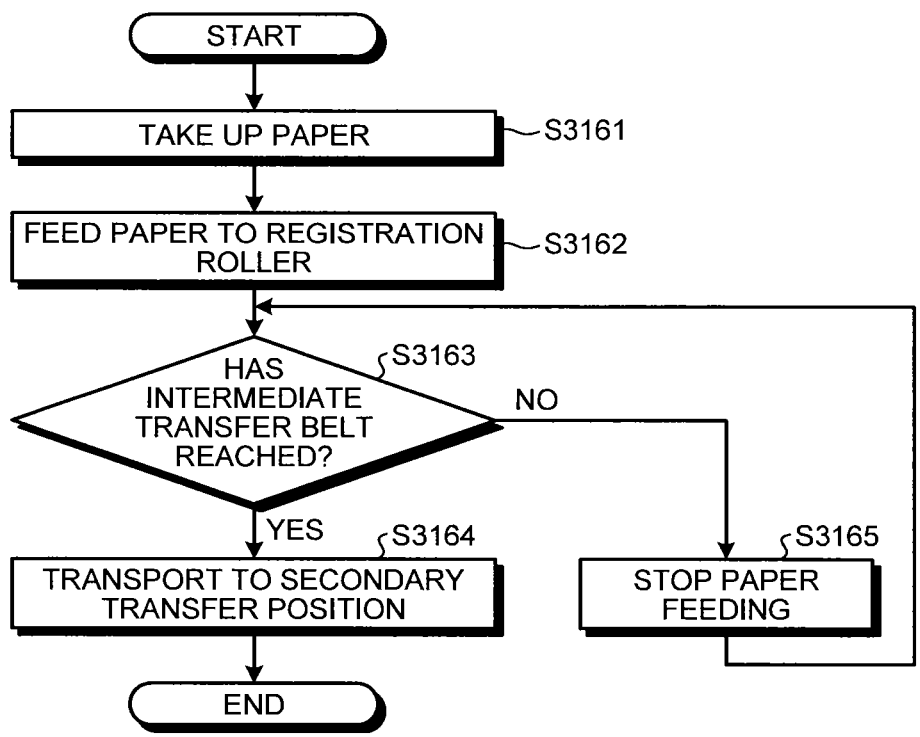
FIG. 9 is a flowchart illustrating details of processing performed by the paper feeding unit.

Processing performed in the image forming apparatus according to the first embodiment will be described below with reference to FIGS. 6 to 9. FIG. 6 is a flowchart illustrating processing performed for managing jobs. FIG. 7 is a flowchart illustrating processing performed by the image forming apparatus. FIG. 8 is a flowchart illustrating details of processing performed by the image forming unit 221. FIG. 9 is a flowchart illustrating details of processing performed by the paper feeding unit 232.

As illustrated in FIG. 6, the receiving unit 211 receives a job transmitted from, for example, an information processing apparatus via, for example, a network or a job input from the scanning unit 5 and an operating unit (not illustrated) of, for example, a touch panel (step S1). Next, the storage/read processing unit 219 stores the job in the job managing DB 2001 by associating a process included in the job received at step S1 with attribute information, paper feeding unit information, and image information (step S2).

As illustrated in FIG. 7, with the job stored in the job managing DB 2001, the storage/read processing unit 219 reads the attribute information, the paper feeding unit information, and the image information stored in association with the process included in a predetermined job stored in the job managing DB 2001 (step S311). The predetermined job is, of jobs stored in the job managing DB 2001, one that is read through a predetermined method. For example, the predetermined job may be a job that is stored first or one having a high predetermined priority order. Subsequent processing will be described on the assumption that the attribute information, the paper feeding unit information, and the image information of the job ID "01" stored in the job managing table illustrated in FIG. 4 are read.

When the job is read at step S311, the processing requesting unit 212 transmits the process ID "001", the process ID "002", and the process ID "003" stored in association with the job ID "01" read, and the image information associated with those process IDs to the image forming unit 221 to thereby make an image formation processing request (step S312). In addition, the processing requesting unit 212 transmits the paper feeding unit information indicated by the process stored in association with the job read to the paper feeding status detecting unit 231 to thereby make a paper feeding processing request (step S313).

When the image formation processing request is made by the processing requesting unit 212 at step S312, the image forming unit 221 starts performing the image forming process using the image information associated with the job ID "01" and the process ID "001" (step S314).

The image forming process performed by the image forming unit 221 at step S314 will here be described with reference to FIG. 8. First, the charging unit 33Y that forms part of the image forming unit 221 contacts the photosensitive drum 32Y and applies voltage thereto, thereby charging the surface of the photosensitive drum 32Y (step S3141). Laser light emitted from an exposing unit (not illustrated) forms an electrostatic latent image on the surface of the photosensitive drum 32Y based on the image information transmitted from the processing requesting unit 212 (step S3142). The developing unit 34Y then affixes toner from the cartridge 31Y to the surface of the photosensitive drum 32Y on which the electrostatic latent image is formed, thus forming an image on the surface of the photosensitive drum 32Y (step S3143). Similarly, the charging units 33M, 33C, and 33K and the developing units 34M, 34C, and 34K form images on surfaces of the photosensitive drums 32M, 32C, and 32K, respectively.

Then, the intermediate transfer belt 35 is fed off while being abutted on the photosensitive drum 32, so that the image formed on the surface of the photosensitive drum 32 is primarily transferred onto the intermediate transfer belt 35 (step S3144). The intermediate transfer belt 35 onto which the image is primarily transferred is transported to the secondary transfer position (step S3145).

Without waiting for the entire image forming process using the image information associated with the process ID "001" to be completed, the image forming unit 221 starts the image forming process using the image information associated with the subsequent process ID "002". Specifically, when the intermediate transfer belt 35 is transported to a predetermined position during the image forming process concerned with the process ID "001", the image forming unit 221 starts the image forming process concerned with the process ID "002". Preferably, an arrangement is made so that the image forming process concerned with the process ID "002" is started to ensure that images are formed efficiently and consecutively depending on the structure of the apparatus.

The image forming process using the image information associated with the process ID "002" follows the same steps as those from step S3141 to step S3145 described above and a description therefor will be omitted. Additionally, without waiting for the entire image forming process using the image information associated with the process ID "002" to be completed, the image forming process using the image information associated with the process ID "003" is started. The image forming process using the image information associated with the process ID "003" also follows the same steps as those from step S3141 to step S3145 described above and a description therefor will be omitted.

Once the image forming process based on the process ID "003" as the last process included in the job ID is started, the image forming process using the image information associated with the process included in the next job, the job ID "02", is started before the image forming process based on the process ID "003" is completed.

Referring back to FIG. 7, while the image forming process started at step S314 described above is being performed, the determining unit 213 determines whether there is a suspension request requesting to suspend the image forming process (step S319) based on a result of the paper feeding status detecting process to be described later.

The paper feeding status detecting process will be described in detail. When the processing requesting unit 212 makes a request for detecting the paper feeding status by transmitting to the paper feeding status detecting unit 231 the paper feeding unit information of each process stored in association with the job at step S313, the paper feeding status detecting unit 231 detects whether paper is loaded in the paper feed tray that corresponds to the smallest process ID of the processes included in that particular job (step S315). Specifically, the paper feeding status detecting unit 231 detects whether paper is loaded in the paper feed tray 41a indicated by the paper feeding unit information "paper feed tray a" that is associated with the process ID "001" of the job managing table illustrated in FIG. 4. When it is detected that paper is loaded in the paper feed tray 41a at step S315, the paper feeding unit 232 performs a paper feeding process for feeding the paper to be used for printing the job ID "01" and the process ID "001" (step S316). As illustrated in FIG. 9, the paper feeding roller 42a that achieves the paper feeding unit 232 takes up the paper loaded in the paper feed tray 41a (step S3161) and feeds the paper to the registration roller 43 (step S3162). If a portion of the intermediate transfer belt 35 onto which an image is primarily transferred reaches the secondary transfer position at which the portion abuts on the secondary transfer roller 36 (step S3163, YES), the paper fed to the registration roller 43 is fed into the nip between the intermediate transfer belt 35 and the secondary transfer roller 36 by the registration roller 43 and further transported to the secondary transfer position (step S3164). If the portion of the intermediate transfer belt 35 onto which the image is primarily transferred does not yet reach the secondary transfer position (step S3163, NO), the paper fed to the registration roller 43 stops at that position until the portion of the intermediate transfer belt 35 onto which the image is primarily transferred reaches the secondary transfer position at which the portion abuts on the secondary transfer roller 36 (step S3165).

When the paper feeding process for the process ID "001" is completed as soon as the paper from the paper feeding unit 232 is transported to the secondary transfer position at step S3164, the paper feeding status detecting unit 231 detects whether paper is loaded in the paper feed tray indicated by the paper feeding unit information that corresponds to a process ID next to the process ID "001" (step S315). Specifically, the paper feeding status detecting unit 231 detects whether paper is loaded in the paper feed tray 41b indicated by the paper feeding unit information "paper feed tray b" that is associated with the process ID "002" of the job managing table illustrated in FIG. 4.

It is noted that, when the paper feeding status of the paper used for printing the job ID "01" and the process ID "002" is detected at step S315, the image forming processes for the job ID "01" and the process ID "003", and the job ID "02" and the process ID "001" are already started. This is because of the following reasons. Specifically, as described above, the paper feeding process takes a longer time than the image forming process does; and while the image forming processes for the job ID "01" and the process ID "003", and the job ID "02" and the process ID "001" are started before the image forming process for the job ID "01" and the process ID "002" is completed, the paper feeding processes for the job ID "01" and the process ID "003", and the job ID "02" and the process ID "001" are started after the paper feeding process for the job ID "01" and the process ID "002" is completed.

If it is detected at step S315 that paper is loaded in the paper feed tray 41b indicated by the paper feeding unit information "paper feed tray b" that is associated with the job ID "01" and the process ID "002", the paper feeding unit 232 performs the paper feeding process for feeding the paper to be used for printing the job ID "01" and the process ID "002" (step S316). Details of this paper feeding process are the same as those of the paper feeding process for the job ID "01" and the process ID "001" described above and a description thereof will be omitted.

Processing to be performed when the paper feeding status detecting process detects that no paper is loaded at step S315 will be described. As a specific exemplary case, processing will be described when no paper is detected to be loaded in the paper feed tray 41b indicated by the paper feeding unit information "paper feed tray b" as a result of the paper feeding status detecting process performed based on the paper feeding unit information associated with the job ID "01" and the process ID "002". In such a case, the image formation control unit 214 transmits to the determining unit 213 a suspension request that requests the image forming unit 221 to suspend the image forming process for the job ID "01" and the process ID "002", and the image forming processes that have already been started for the job ID "01" and the process ID "003", and the job ID "02" and the process ID "001" (step S318).

When the determining unit 213 receives the suspension request, the image formation control unit 214 causes the image forming unit 221 to suspend the image forming process for the job ID "01" and the process ID "002", and the image forming processes that have already been started for the job ID "01" and the process ID "003", and the job ID "02" and the process ID "001" (step S323).

A case in which no suspension request is received at S319 will be described. In this case, after the image forming process is completed, the paper feeding process at step S316 causes an image to be secondarily transferred onto the paper transported onto the intermediate transfer belt 35 (step S320). Next, the pressing roller 371 presses the paper against the fixing belt 372 and applies heat to the paper to thereby fix the image thereinto (step S321). Finally, the paper into which the image is fixed is discharged to the discharge tray (step S322).

If it is detected that no paper is loaded in the paper feed tray relating to the preceding job, the image forming process in accordance with the process or job started later is suspended, so that printing is not performed in accordance with the subsequent job immediately after printed matter printed only halfway. This achieves an effect of preventing the user from being confused by printed pages of one job mixed with those of another on the discharge tray.

Second Embodiment

A second embodiment of the present invention will be described below. The second embodiment differs from the first embodiment in that, when it is detected through the paper feeding status detecting process that no paper is loaded, the determining unit 213 determines whether to suspend the image forming process for the subsequent job that has been started based on the attribute information.

A general configuration of the second embodiment, a hardware configuration of the second embodiment, and a functional configuration of the second embodiment are the same as the general configuration of the first embodiment, the hardware configuration of the first embodiment, and the functional configuration of the first embodiment, respectively and descriptions therefor will be omitted.

Figure 10:
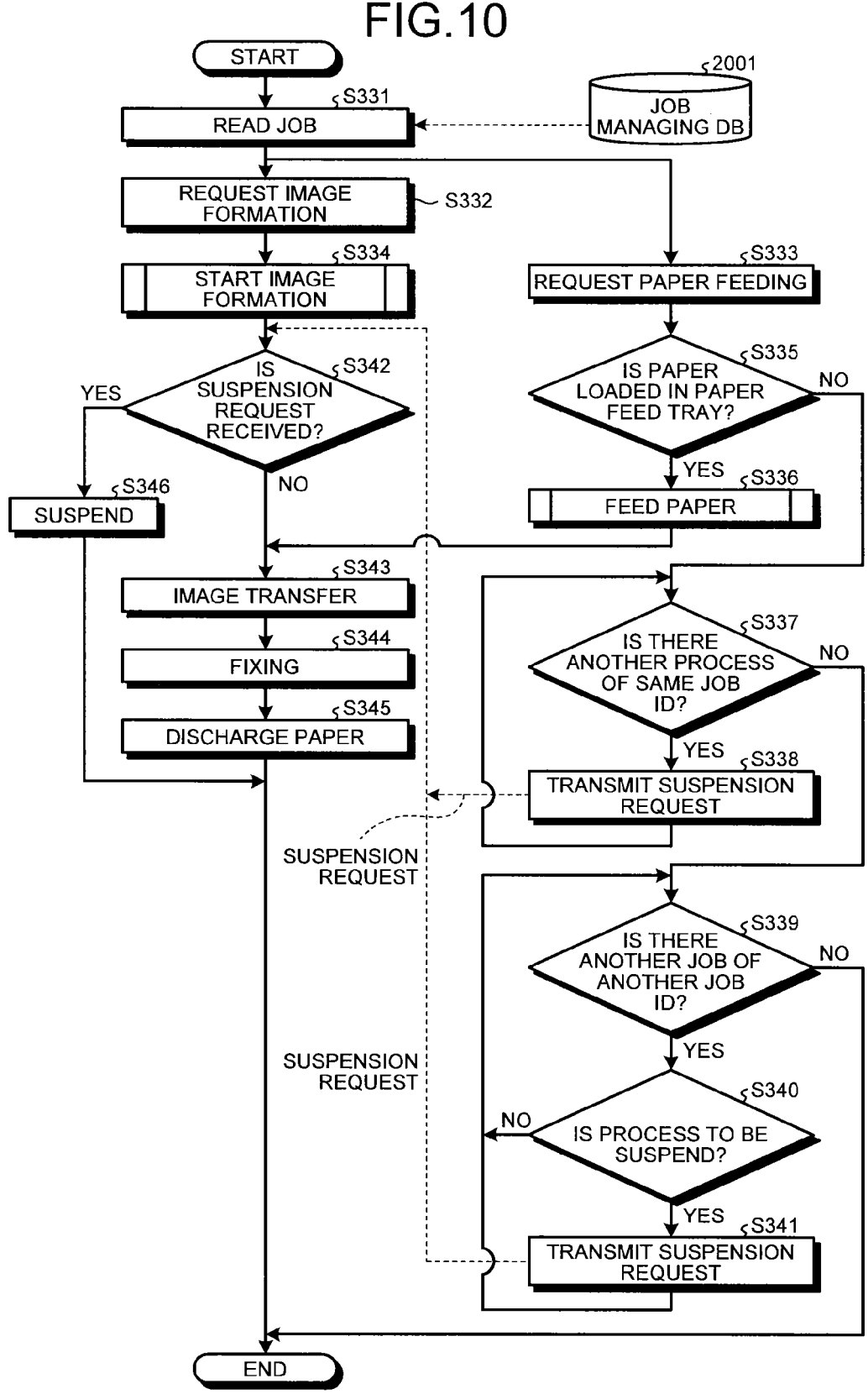
FIG. 10 is a flowchart illustrating processing performed by an image forming apparatus according to a second embodiment of the present invention.
Figure 11A:
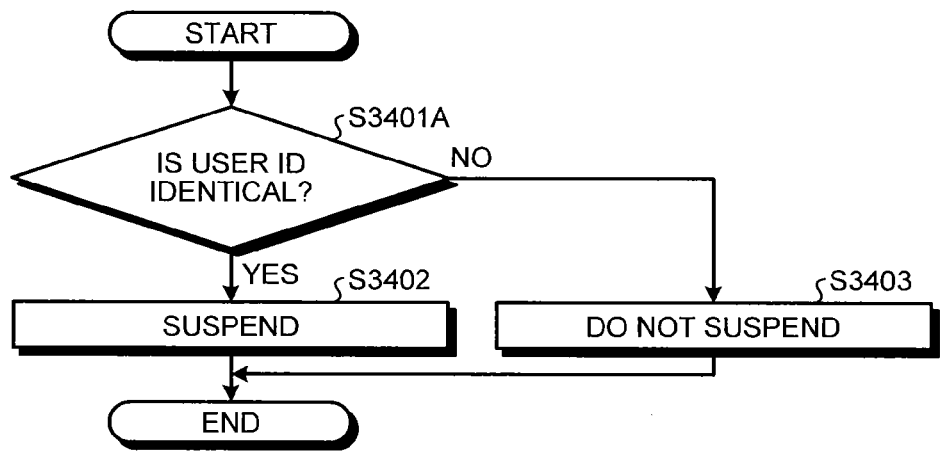
FIG. 11A is a flowchart illustrating an example of processing performed by a determining unit.
Figure 11B:
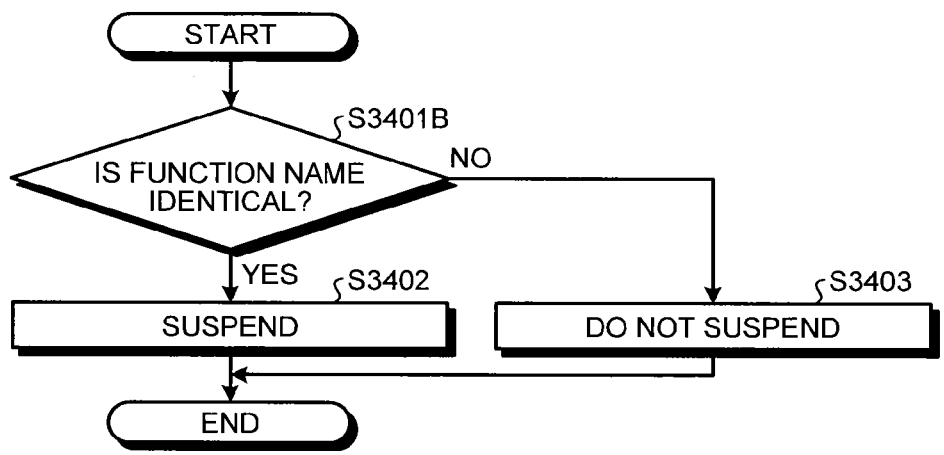
FIG. 11C is a flowchart illustrating a still another example of processing performed by the determining unit.
Figure 11C:
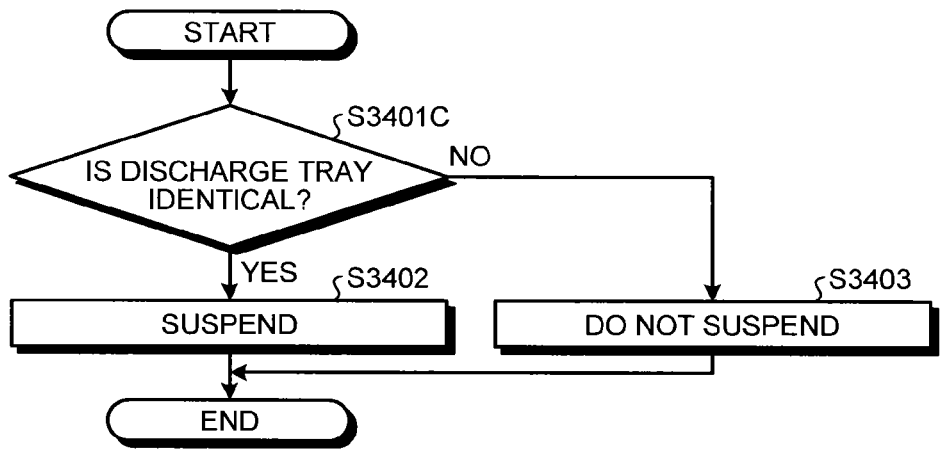

Processing and operation of the second embodiment of the present invention will be described below with reference to FIGS. 6, and 8 to 11C. FIG. 10 is a flowchart illustrating processing performed by an image forming apparatus according to the second embodiment of the present invention. FIGS. 11A, 11B, and 11C are flowcharts illustrating examples of processing performed by the determining unit 213.

As illustrated in FIG. 6, the receiving unit 211 receives a job transmitted from, for example, an information processing apparatus via, for example, a network or a job input from the scanning unit 5 and an operating unit (not illustrated) of, for example, a touch panel (step S1). Next, the storage/read processing unit 219 stores the job in the job managing DB 2001 by associating a process included in the job received at step S1 with attribute information, paper feeding unit information, and image information (step S2).

As illustrated in FIG. 10, with the job stored in the job managing DB 2001, the storage/read processing unit 219 reads the attribute information, the paper feeding unit information, and the image information stored in association with the process included in a predetermined job stored in the job managing DB 2001 (step S331). The predetermined job is, of jobs stored in the job managing DB 2001, one that is read through a predetermined method. For example, the predetermined job may be a job that is stored first or one having a high predetermined priority order. Subsequent processing will be described on the assumption that the attribute information, the paper feeding unit information, and the image information of the job ID "01" stored in the job managing table illustrated in FIG. 4 are read.

When the job is read at step S331, the processing requesting unit 212 transmits the process ID "001", the process ID "002", and the process ID "003" stored in association with the job ID "01" read, and the image information associated with those process IDs to the image forming unit 221 to thereby make an image formation processing request (step S332). In addition, the processing requesting unit 212 transmits the paper feeding unit information indicated by the process stored in association with the job read to the paper feeding status detecting unit 231 to thereby make a paper feeding processing request (step S333).

When the image formation processing request is made by the processing requesting unit 212 at step S332, the image forming unit 221 starts performing the image forming process using the image information associated with the job ID "01" and the process ID "001" (step S334).

The image forming process performed by the image forming unit 221 at step S334 will here be described with reference to FIG. 8. First, the charging unit 33Y that forms part of the image forming unit 221 contacts the photosensitive drum 32Y and applies voltage thereto, thereby charging the surface of the photosensitive drum 32Y (step S3141). Laser light emitted from the exposing unit (not illustrated) forms an electrostatic latent image on the surface of the photosensitive drum 32Y based on the image information transmitted from the processing requesting unit 212 (step S3142). The developing unit 34Y then affixes toner from the cartridge 31Y to the surface of the photosensitive drum 32Y on which the electrostatic latent image is formed, thus forming an image on the surface of the photosensitive drum 32Y (step S3143). Similarly, the charging units 33M, 33C, and 33K and the developing units 34M, 34C, and 34K form images on surfaces of the photosensitive drums 32M, 32C, and 32K, respectively.

Then, the intermediate transfer belt 35 is fed off while being abutted on the photosensitive drum 32, so that the image formed on the surface of the photosensitive drum 32 is primarily transferred onto the intermediate transfer belt 35 (step S3144). The intermediate transfer belt 35 onto which the image is primarily transferred is transported to the secondary transfer position (step S3145).

Without waiting for the entire image forming process using the image information associated with the process ID "001" to be completed, the image forming unit 221 starts the image forming process using the image information associated with the subsequent process ID "002". Specifically, when the intermediate transfer belt 35 is transported to a predetermined position during the image forming process concerned with the process ID "001", the image forming unit 221 starts the image forming process concerned with the process ID "002". Preferably, an arrangement is made so that the image forming process concerned with the process ID "002" is started to ensure that images are formed efficiently and consecutively depending on the structure of the apparatus.

The image forming process using the image information associated with the process ID "002" follows the same steps as those from step S3141 to step S3145 described above and a description therefor will be omitted. Additionally, without waiting for the entire image forming process using the image information associated with the process ID "002" to be completed, the image forming process using the image information associated with the process ID "003" is started. The image forming process using the image information associated with the process ID "003" also follows the same steps as those from step S3141 to step S3145 described above and a description therefor will be omitted.

Once the image forming process based on the process ID "003" as the last process included in the job ID is started, the image forming process using the image information associated with the process included in the next job, the job ID "02", is started before the image forming process based on the process ID "003" is completed.

Referring back to FIG. 10, while the image forming process started at step S334 described above is being performed, it is determined whether there is a suspension request requesting to suspend the image forming process (step S342) based on a result of the paper feeding status detecting process to be described later.

The paper feeding status detecting process will be described in detail. When the processing requesting unit 212 makes a request for detecting the paper feeding status by transmitting to the paper feeding status detecting unit 231 the paper feeding unit information of each process stored in association with the job at step S333, the paper feeding status detecting unit 231 detects whether paper is loaded in the paper feed tray that corresponds to the smallest process ID of the processes included in that particular job (step S335). Specifically, the paper feeding status detecting unit 231 detects whether paper is loaded in the paper feed tray 41a indicated by the paper feeding unit information "paper feed tray a" that is associated with the process ID "001" of the job managing table illustrated in FIG. 4.

When it is detected that paper is loaded in the paper feed tray 41a at step S335, the paper feeding unit 232 performs a paper feeding process for feeding the paper to be used for printing the job ID "01" and the process ID "001" (step S336). As illustrated in FIG. 9, the paper feeding roller 42a that achieves the paper feeding unit 232 takes up the paper loaded in the paper feed tray 41a (step S3161) and feeds the paper to the registration roller 43 (step S3162). If a portion of the intermediate transfer belt 35 onto which an image is primarily transferred reaches the secondary transfer position at which the portion abuts on the secondary transfer roller 36 (step S3163, YES), the paper fed to the registration roller 43 is fed into the nip between the intermediate transfer belt 35 and the secondary transfer roller 36 by the registration roller 43 and further transported to the secondary transfer position (step S3164). If the portion of the intermediate transfer belt 35 onto which the image is primarily transferred does not yet reach the secondary transfer position (step S3163, NO), the paper fed to the registration roller 43 stops at that position until the portion of the intermediate transfer belt 35 onto which the image is primarily transferred reaches the secondary transfer position at which the portion abuts on the secondary transfer roller 36 (step S3165).

When the paper feeding process for the process ID "001" is completed as soon as the paper from the paper feeding unit 232 is transported to the secondary transfer position at step S3164, the paper feeding status detecting unit 231 detects whether paper is loaded in the paper feed tray indicated by the paper feeding unit information that corresponds to a process ID next to the process ID "001" (step S335 in FIG. 10). Specifically, the paper feeding status detecting unit 231 detects whether paper is loaded in the paper feed tray 41b indicated by the paper feeding unit information "paper feed tray b" that is associated with the process ID "002" of the job managing table illustrated in FIG. 4.

It is noted that, when the paper feeding status of the paper used for printing the job ID "01" and the process ID "002" is detected at step S335, the image forming processes for the job ID "01" and the process ID "003", and the job ID "02" and the process ID "001" are already started. This is because of the following reasons. Specifically, as described earlier under "Timing of processing by each functional unit", the paper feeding process takes a longer time than the image forming process does; and while the image forming processes for the job ID "01" and the process ID "003", and the job ID "02" and the process ID "001" are started before the image forming process for the job ID "01" and the process ID "002" is completed, the paper feeding processes for the job ID "01" and the process ID "003", and the job ID "02" and the process ID "001" are started after the paper feeding process for the job ID "01" and the process ID "002" is completed.

If it is detected at step S335 that paper is loaded in the paper feed tray 41b indicated by the paper feeding unit information "paper feed tray b" that is associated with the process ID "002", the paper feeding unit 232 performs the paper feeding process for feeding the paper to be used for printing the job ID "01" and the process ID "002" (step S336). Details of this paper feeding process are the same as those of the paper feeding process for the job ID "01" and the process ID "001" described above and a description thereof will be omitted.

Processing to be performed when the paper feeding status detecting process detects that no paper is loaded at step S335 will be described. As a specific exemplary case, processing will be described when no paper is detected to be loaded in the paper feed tray 41b indicated by the paper feeding unit information "paper feed tray b", as detected by the paper feeding status detecting unit 231 as a result of its performing the paper feeding status detecting process based on the paper feeding unit information associated with the job ID "01" and the process ID "002".

In such a case, the determining unit 213 determines whether there is another process of the job ID "01" for which an image forming process is already started after the image forming process for the job ID "01" and the process ID "002" has been started (step S337). If it is determined that there is another process of the job ID "01" at step S337, the determining unit 213 transmits a suspension request for suspending that particular process to the image formation control unit 214 (step S338). The image formation control unit 214, having received the suspension request, causes the image forming unit 221 to suspend the image forming process based on that particular process (step S346).

The processes of step S337 and step S338 are repeatedly performed until the determining unit 213 determines that there is no other process of the job ID "01" for which the image forming process is started after the image forming process for the job ID "01" and the process ID "002" has been started.

If it is determined that there is no other process of the job ID "01" at step S337, the determining unit 213 determines whether there is another job for which an image forming process is started after the image forming process for the job ID "01" and the process ID "002" has been started (step S339).

If it is determined that there is no other job at step S339, the determining unit 213 terminates the determining process.

If it is determined that there is another job at step S339, the determining unit 213 performs an attribute information determining process based on the attribute information of the job ID "02" of another job for which an image forming process has already been started, thereby determining whether to suspend the image forming process (step S340).

Details of the attribute information determining process at step S340 will be described with reference to FIG. 11A. As illustrated in Referring to FIG. 11A, the determining unit 213 first determines whether a user ID included in the attribute information that corresponds to the job ID "02" is the same as a user ID that corresponds to the job ID "01" (step S3401A).

If it is determined at step S3401A that the user ID that corresponds to the job ID "02" is the same as the user ID that corresponds to the job ID "01", the determining unit 213 determines to suspend the image forming process based on the job ID "02" (step S3402) and terminates the determining process. Then, the determining unit 213 transmits a suspension request to the image formation control unit 214 (step S341 of FIG. 10). Having received the suspension request, the image formation control unit 214 causes the image forming unit 221 to suspend the image forming process for the job ID "02" (step S346).

If it is determined at step S3401A that the user ID that corresponds to the job ID "02" is not the same as the user ID that corresponds to the job ID "01", the determining unit 213 determines not to suspend the image forming process based on the job ID "02" (step S3403) and terminates the determining process. At this time, the image forming unit 221 continues to perform the abovementioned image forming process.

The processes of from step S339 to step S341 are repeatedly performed until the determining unit 213 determines that there is no other job for which an image forming process is already started.

As illustrated in FIG. 10, when the image forming process performed by the image forming unit 221 is completed, the image that has been primarily transferred onto the intermediate transfer belt 35 is secondarily transferred onto the paper that has been transported onto the intermediate transfer belt 35 through the paper feeding process at step S336 (step S343). Next, the pressing roller 371 presses the paper against the fixing belt 372 and applies heat to the paper to thereby fix the image thereinto (step S344). Finally, the paper into which the image is fixed is discharged to the discharge tray (step S345).

Even if it is detected that no paper used for printing based on a preceding job is loaded in the paper feed tray, printing based on a job that has been started later is continued without suspension as long as the user ID of the job started later differs from the user ID of the job started earlier. This achieves an effect of allowing the user to obtain printed matter early without being confused.

In the second embodiment described above, the determining unit 213 determines whether the user names are identical at step S3401A; however, as illustrated at step S3401B of FIG. 11B, it may be determined whether the functional names are identical. Even if a paper-out condition occurs while a job using the print function is being performed, the foregoing arrangement allows a subsequent job using the copying function to continue, so that printed matter generated through the copying function can be obtained earlier. This enhances convenience to the user.

Alternatively, as illustrated at step S3401C of FIG. 11C, the determining unit 213 may determine whether the discharging unit information is identical. Even if a paper-out condition occurs while a job that is started earlier is being performed, and if a different discharging unit is assigned for another job that is started later, different sets of printed matter are not discharged in the discharge tray and the user can earlier obtain printed based on the job that is started later. This enhances convenience to the user.

Yet alternatively, the specific attribute information to be used for the determination, whether it be the user name, the function name, or the discharging unit information, may be determined according to a predetermined condition.

According to the embodiments, if it is determined that no recording medium is loaded in the paper feeding unit associated with the preceding job, the image forming process based on the job started subsequently is suspended. Therefore, the recording medium on which the image is formed in accordance with the job started subsequently is not discharged after only part of the recording medium on which the image is formed in accordance with the job started earlier is discharged. Thus, recording media with images formed thereon in accordance with different jobs are not mixed with each other in the discharging unit, which achieves an effect of preventing the user from being confused.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image forming unit configured to perform image formation in accordance with jobs including a first job and a second job, the image forming unit starting image formation in accordance with the second job while performing the image formation in accordance with the first job, each of the first job and the second job including paper feeding unit information indicating one of paper feeding units;

a detecting unit configured to detect whether a recording medium is stored in a paper feeding unit indicated by the paper feeding unit information of the first job; and an image formation control unit, functionally connected to the image forming unit and the detecting unit, configured to cause the image forming unit to continue, when the first job is ending, the image formation in accordance with the second job when the detecting unit detects that a recording medium is stored in the paper feeding unit, and cause the image forming unit to suspend the image formation in accordance with the second job when the detecting unit detects that no recording medium is stored in the paper feeding unit.

2. The image forming apparatus according to claim 1, further comprising:

an image formation requesting unit configured to request the image forming unit to perform an image forming process in response to each of the first job and the second job; and a paper feeding requesting unit configured to request the paper feeding unit to perform a paper feeding process in accordance with the job corresponding to the image forming process requested by the image formation requesting unit, wherein the image forming unit starts the image formation in accordance with the second job corresponding to the image forming process requested by the image formation requesting unit while performing the image formation in accordance with the first job corresponding to the image forming process requested by the image formation requesting unit, and the detecting unit detects whether a recording medium is stored in a paper feeding unit indicated by the paper feeding unit information of the first job corresponding to the image forming process requested by the image formation requesting unit.

3. The image forming apparatus according to claim 1, wherein the first job includes items of first attribute information, the second job includes items of second attribute information, the image forming apparatus further comprises a determining unit configured to determine whether one of the items of first attribute information is identical to one of the items of second attribute information when the detecting unit detects that no recording medium is stored in the paper feeding unit, the image formation control unit causes the image forming unit to suspend the image formation in accordance with the second job when the determining unit determines that one of the items of first attribute information is identical to one of the items of the second attribute information, the image formation control unit causes, and the image formation control unit causes the image forming unit to continue the image formation in accordance with the second job when the determining unit determines that one of the items of first attribute information is not identical to one of the items of second attribute information.

4. The image forming apparatus according to claim 3, wherein the items of first attribute information include user identification information for uniquely identifying a user who transmits the first job to the image forming apparatus, and the items of second attribute information include user identification information for uniquely identifying a user who transmits the second job to the image forming apparatus.

5. The image forming apparatus according to claim 3, wherein the items of first attribute information include discharging unit identification information for identifying a discharging unit to which a recording medium used in the image formation in accordance with the first job is discharged, and the items of second attribute information include discharging unit identification information for identifying a discharging unit to which a recording medium used in the image formation in accordance with the second job is discharged.

6. The image forming apparatus according to claim 3, wherein the items of first attribute information include function identification information for identifying a function that is performed in accordance with the first job by the image forming apparatus, and the items of second attribute information include function identification information for identifying a function that is performed in accordance with the second job by the image forming apparatus.

7. An image forming method comprising:

performing image formation in accordance with a first job that includes paper feeding unit information indicating one of paper feeding units;

starting image formation in accordance with a second job that includes paper feeding unit information indicating one of the paper feeding units while performing the image formation in accordance with the first job;

detecting whether a recording medium is stored in a paper feeding unit indicated by the paper feeding unit information of the first job; and continuing the image formation in accordance with the second job when it is detected that a recording medium is stored in the paper feeding unit, and suspending the image formation in accordance with the second job when it is detected that no recording medium is stored in the paper feeding unit.

8. A non-transitory computer-readable recording medium with an executable program stored thereon, wherein the program instructs a processor of an image forming apparatus to perform:

performing image formation in accordance with a first job that includes paper feeding unit information indicating one of paper feeding units;

starting image formation in accordance with a second job that includes paper feeding unit information indicating one of the paper feeding units while performing the image formation in accordance with the first job;

detecting whether a recording medium is stored in a paper feeding unit indicated by the paper feeding unit information of the first job; and continuing the image formation in accordance with the second job when it is detected that a recording medium is stored in the paper feeding unit, and suspending the image formation in accordance with the second job when it is detected that no recording medium is stored in the paper feeding unit.

* * * * *